April 1, 1941.  H. LEVY  2,236,799
CARBON ECONOMIZING MEANS FOR ELECTRIC ARC APPARATUS
Filed Sept. 23, 1938
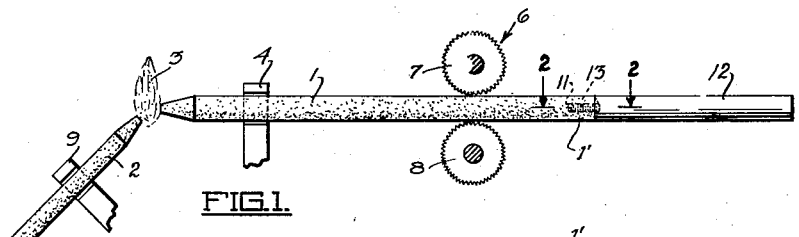
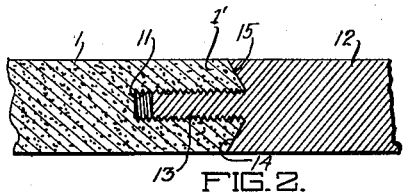
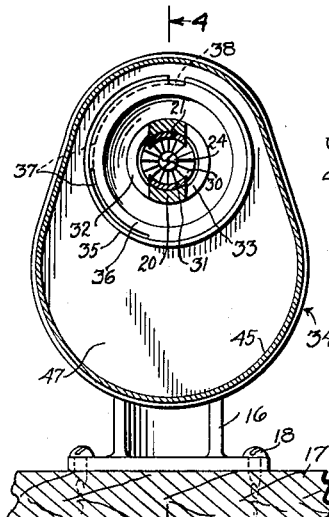
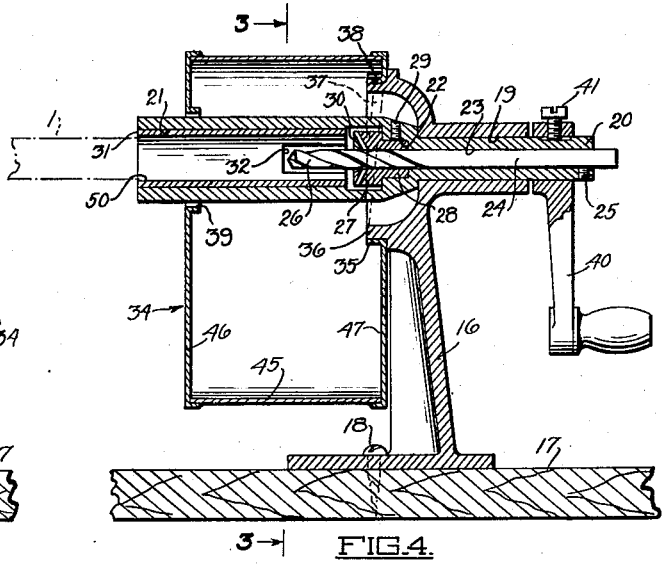
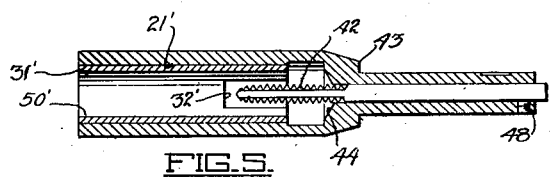
INVENTOR.
HARRY LEVY
BY W E Beatty
ATTORNEY.

Patented Apr. 1, 1941

2,236,799

UNITED STATES PATENT OFFICE 2,236,799

CARBON ECONOMIZING MEANS FOR ELECTRIC ARC APPARATUS

Harry Levy, New York, N. Y., assignor to Warner Bros. Pictures, Inc., New York, N. Y., a corporation of Delaware Application September 23, 1938, Serial No. 231,383

3 Claims. (Cl. 77—7)

This invention relates to electric arc apparatus and has particular reference to a carbon electrode economizing device or adaptor and to means for forming a carbon electrode to permit attachment thereto of a carbon economizing adaptor.

In commercial practice, long cylindrical carbon rods are employed as electrodes in electric arc projectors. These electrodes are situated with the tips thereof closely adjacent to each other to form an arc when current is passed thereacross and are fed into the arc by suitable feeding devices at a rate determined by the burning rate of the tips thereof.

Carbon feeding devices, regardless of the type, are generally placed a considerable distance back of the burning tips of the carbons to prevent overheating and burning thereof as well as to permit current supplying brushes for the carbons to be placed relatively close to the arc. Thus, heretofore, when a carbon was reduced to a length equal to the distance between the feeding device and the arc, the carbon had to be thrown away and replaced by a new one.

The main object of the present invention is to utilize substantially the whole length of a carbon electrode in an electric arc apparatus.

Another object of the invention is to securely fasten a carbon economizing adaptor to the end of a carbon electrode and in alignment therewith.

A further object of the invention is to provide a device for forming the end of a carbon electrode for fastening the same to a carbon economizing adaptor.

A further object of the invention is to form a co-axially extending hole in the end of a carbon electrode.

The manner in which the above and other objects of the invention are accomplished will be understood on reference to the following specification read in conjunction with the accompanying drawing wherein:

Fig. 1 is a diagrammatic view of the electrode assembly in an electric arc lamp.

Fig. 2 is a sectional, longitudinal view through an electrode and an adaptor secured thereto, embodying the present invention, and is taken along the line 2—2 of Fig. 1.

Fig. 3 is a transverse sectional view through the carbon forming device embodying the present invention and is taken along the line 3—3 of Fig. 4.

Fig. 4 is a longitudinal sectional view through the carbon forming device and is taken along the line 4—4 of Fig. 3.

Fig. 5 is a transverse sectional view through the chuck for the tapping tool.

Referring to Fig. 1, the positive carbon electrode 1 and negative carbon electrode 2 of an electric arc lamp are shown as being arranged at an angle to each other with the tips thereof closely adjacent to one another to form, when an electric current is passed thereacross, an arc 3. A current supplying brush 4 in frictional contact with the carbon 1, is placed as close as possible to the arc 3 to reduce voltage losses due to the resistance of the carbon 1 and is connected in a manner not shown to a suitable source of current supply.

The feeding device for the positive carbon 1 is diagrammatically and generally indicated at 6 as comprising feeding rollers 7 and 8, serrated around their peripheries and engaging diametrically opposite portions of the circumference of the carbon electrode 1. These wheels 7 and 8 are rotated in a suitable manner (not shown) to impart a longitudinal feeding movement to the carbon 1, to adjust the same for burning away of the tip thereof by the arc 3.

A current supplying brush 9, similar to that of 4, is provided in frictional engagement with the negative carbon 2 to electrically connect the same to the current supply for the arc apparatus. A carbon feeding device, (not shown) which may be similar to that of 6, is provided to longitudinally feed the negative electrode into the arc 3.

As shown in Figs. 1 and 2, the end 1' of the positive carbon 1, opposite the burning tip thereof, is provided with a co-axially extending screw threaded hole 11. The end face of carbon 1 surrounding the hole 11 is formed into a conical convex shape 15, also co-axial with the carbon 1. A carbon adaptor 12, cylindrical in form and of the same diameter as that of the carbon 1, has a co-axial screw threaded projection 13 extending therefrom and in threaded engagement with the hole 11 in carbon 1. The adaptor 12 although preferably of metal may be made of any suitable material which will withstand the heat generated by the arc 3. The end face 14 of the adaptor 12 is conically depressed concentrically about the projection 13 to form a seat against which the conical end face 15 of the carbon 1 abuts. It has been found that the provision of the complementarily formed abutting conical or tapered ends of the carbon 1 and adaptor 12 aids in centering, locking and steadying the carbon 1 and adaptor 12 in alignment with each other. This is probably due to the fact that the conical engaging ends 14 and 15 present larger areas of frictional surfaces as well as due to the wedging action of the electrode 1 upon the adaptor 12.

A metal adaptor (not shown) similar to that of 12, may be provided for the negative electrode 2.

The device for forming the end 1' of the electrode 1 to receive the adaptor 12 is shown in Figs. 3 and 4 and comprises an upstanding bearing bracket 16 secured to a base 17 by screws 18. A horizontally extending bearing 19 is formed on the bracket 16 to journal a cylindrical drill chuck or holder 20 therein.

Chuck 20 is provided with a large bore 21, a short intermediate sized bore 22 and a small bore 23, all in co-axial and co-extensive alignment with each other. A drill 24 is secured in the small bore 23 by a set screw 25 and has the cutting end 26 thereof extending into the large bore 21. An annular end mill 27 is provided at the base of the large bore 21, surrounding the drill 24. A reduced portion 28 on mill 27 fits in the intermediate bore 22 and is secured therein by a set screw 29. A plurality of radially extending cutting teeth 30 are formed on the end of the mill 27. These cutting teeth 30 have the cutting edges thereof converging inwardly to form a conically depressed cutter for forming the conical convex end face 15 of carbon 1. A bushing 31 is secured in the bore 21 with the inside diameter or bore 50 thereof slightly larger than the diameter of the carbon 1 so as to slidably receive and journal the carbon 1 whereby the carbon is centered during the drilling and end cutting operation. This bore 50 therefore forms the large carbon journalling bore of the chuck 20. Slots 32 and 33 (Fig. 3) are provided in diametrically opposed sides of the chuck 20 and extend co-extensively through the bushing 31 onto the carbon journalling bore 50. These slots 32 and 33 are located adjacent the cutting edges of the drill 24 and end mill 27 to permit the carbon dust or particles removed from the carbon 1 by such cutting edges to fall therethrough when the chuck 20 is rotated.

A waste receptacle 34 is provided to receive the carbon dust falling through the slots 32 and 33, and comprises a substantially oval shaped shell 45 enclosed by sides 46 and 47. A circular inwardly extending flange 35 in the side 47 of the waste receptacle 34 forms an opening therein and is fitted over a circular flange 36 formed on the bracket 16 concentric with the bearing 19. A helically extending slot 37 is formed in the periphery of the flange 36 to receive a lug or ear 38 bent inwardly from the flange 35, thereby to lock the waste receptacle 34 in correct position on the bracket 16 while permitting removal of the receptacle by rotating the same in a counterclockwise direction on the flange 36 of bracket 16. The opposite side 46 of the waste receptacle 34 has an opening 39 formed therein, co-axial with the flange 35, through which the chuck 20 extends.

A manually operable handle 40 is removably secured on the smaller end of the chuck 20 by a set screw 41 to provide for rotation of the chuck and to prevent longitudinal movement thereof.

When a carbon is to be formed to permit attachment thereto of an adaptor 12, the end of the carbon is inserted in the bore 50 of bushing 31 and is held from rotation by the operator while turning the handle 40. As the chuck 20 is rotated the operator feeds the carbon 1 inwardly causing the drill 24 to cut the co-axially extending hole 11 therein. As the end face of the carbon 1 reaches the cutting teeth 30 in the end mill 27 these teeth form the conical end face formation 15 (Fig. 2). During this time the carbon dust removed by the drill 26 and end mill 27 drops through the slots 32 and 33 into the waste receptacle 34.

The previously formed co-axially extending hole in the carbon is screw tapped by means of a tapping tool 42 (Fig. 5). Tool 42 is of the usual type and is secured in a chuck 43 by a set screw 48. Chuck 43 is interchangeable with the drill chuck 20 and is similar thereto except that no intermediately sized bore is provided therein and further, the base of the bore 21' has a conical depression 44 therein surrounding and co-axial with the tapping tool 42. Depression 44 is of the same shape as the depressed end face 15 on adaptor 12 (Fig. 2) so as to permit the conical end face of the carbon, formed by the teeth 30 of end mill 27, to seat itself thereon. The bore 50' of bushing 31' is of the same diameter as that of 50 in the chuck 20 to slidably receive and journal, as well as center, the carbon. Slots as at 32', similar to those of 32 and 33 (Figs. 3 and 4), are provided to permit the carbon dust removed by the tapping tool 42 to fall therethrough.

When the hole in the previously drilled carbon is to be tapped, the set screw 41 on the handle 40 (Fig. 4) is released permitting the handle 40 to be removed and the chuck 20 to be slid longitudinally out of the bearing 19. The tapping chuck 43 is then inserted in the bearing 19 and the handle 40 secured to the end thereof in the same manner that it was previously secured to chuck 20. The carbon is inserted in the bore 31' and is again held from rotation by the operator while turning the handle 40. During this time the operator feeds the carbon lengthwise onto the tapping tool 42 to form internal screw threads in the co-axial hole therein.

If desired, the bushings 31 and 31' in the chucks 20 and 43, respectively, may be omitted by forming the bores 21 and 21', respectively, of the same size as the bushing bores 50 and 50', respectively.

Further, bushings having different inside diameters may be removably placed in the bores 21 and 21' to accommodate and center carbons of different diameters. In this event the smaller diameter negative carbon 2 (Fig. 1) may be formed by the same device as is used for forming the larger positive carbon 1 by merely interchanging appropriately sized bushings.

I claim:

1. A device for forming the end of a rod-like member comprising the combination of a chuck having at one end thereof a cylindrical bore therein adapted to slidably receive and journal said member, and having at the other end thereof a tool receiving bore and an outer bearing surface surrounding said tool receiving bore, a fixed bearing for said bearing surface, means for fixedly securing a cutting tool in said tool receiving bore with the cutting end thereof extending concentrically into said cylindrical bore, said other end of said chuck projecting beyond said fixed bearing, a handle on said projecting end, and means on said projecting end for securing a tool in said tool receiving bore.

2. A device for forming a hole co-axially through the end of a rod-like member comprising a chuck having at one end thereof a cylindrical bore therein adapted to slidably receive and journal said member, and having at the other end thereof an outer bearing surface, a cylindrical drilling tool of a diameter smaller than said rod-like member, a fixed bearing for said outer bearing surface, a shoulder on said chuck at one end of said bearing, a handle on said chuck at the other end of said bearing, and means for fixedly securing said tool in said chuck with the cutting end thereof extending co-axially into said bore.

3. A device for forming the end of a rod comprising a chuck having a counterbore therethrough, the enlarged portion of said bore being adapted to slidably receive and journal said rod therein, a cutting tool, means securing said tool in the reduced portion of said bore with the cutting end thereof extending co-axially into said enlarged portion of said bore, and means for rotatably supporting said chuck comprising a fixed bearing supporting the reduced bore portion of said chuck with the reduced portion of the bore of said chuck projecting beyond the ends of said bearing.

HARRY LEVY.